United States Patent
Sarkar et al.

(10) Patent No.: US 12,153,510 B2
(45) Date of Patent: Nov. 26, 2024

(54) METHOD AND DEVICE FOR OPERATING FUZZ TESTING OF A PROGRAM CODE

(71) Applicant: Robert Bosch GmbH, Stuttgart (DE)

(72) Inventors: Anupam Sarkar, Kolkata (IN); Christopher Huth, Weil der Stadt (DE); Hans Loehr, Nuremberg (DE); Simon Greiner, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 480 days.

(21) Appl. No.: 17/336,930

(22) Filed: Jun. 2, 2021

(65) Prior Publication Data
US 2022/0027261 A1    Jan. 27, 2022

(30) Foreign Application Priority Data
Jul. 21, 2020    (DE) .......................... 102020209137.4

(51) Int. Cl.
| | | |
|---|---|---|
| *G06F 9/44* | (2018.01) | |
| *G06F 8/41* | (2018.01) | |
| *G06F 11/30* | (2006.01) | |
| *G06F 11/34* | (2006.01) | |
| *G06F 11/36* | (2006.01) | |

(52) U.S. Cl.
CPC ............ *G06F 11/3688* (2013.01); *G06F 8/44* (2013.01); *G06F 11/302* (2013.01); *G06F 11/3495* (2013.01)

(58) Field of Classification Search
None
See application file for complete search history.

(56) References Cited

U.S. PATENT DOCUMENTS

| | | | | |
|---|---|---|---|---|
| 5,881,288 | A * | 3/1999 | Sumi ................... | G06F 11/3624 717/113 |
| 9,459,988 | B2 * | 10/2016 | Guan ................... | G06F 11/3624 |
| 10,649,749 | B1 * | 5/2020 | Brooker .............. | G06F 11/3624 |
| 2008/0141380 | A1 * | 6/2008 | Ikeda ................... | G06F 21/121 717/120 |
| 2008/0301647 | A1 * | 12/2008 | Neystadt ............. | G06F 11/3672 717/127 |
| 2014/0331210 | A1 * | 11/2014 | Bowler ................ | G06F 8/443 717/129 |
| 2018/0322028 | A1 * | 11/2018 | Davis .................. | G06F 11/3636 |
| 2019/0196939 | A1 * | 6/2019 | Lengauer ............ | G06F 11/3644 |

* cited by examiner

*Primary Examiner* — Qamrun Nahar
(74) *Attorney, Agent, or Firm* — NORTON ROSE FULBRIGHT US LLP; Gerard A. Messina

(57) ABSTRACT

A computer-implemented method for performing a test for a program code. The method includes the following steps: providing a modified program code, which includes the program code to be tested and at least one code segment, the at least one code segment monitoring an execution sequence of execution segments, and the code segment being developed to induce a program termination when an impermissible execution sequence is detected; performing a fuzz test for the modified program code; signaling a program termination when an impermissible execution sequence is detected.

7 Claims, 2 Drawing Sheets

METHOD AND DEVICE FOR OPERATING FUZZ TESTING OF A PROGRAM CODE

CROSS REFERENCE

The present application claims the benefit under 35 U.S.C. § 119 of German Patent Application No. DE 102020209137.4 filed on Jul. 21, 2020, which is expressly incorporated herein by reference in its entirety.

FIELD

The present invention relates to methods for testing a program code by what is generally known as fuzz testing. In particular, the present invention relates to measures for detecting errors in an execution sequence of program functions with the aid of fuzz testing.

BACKGROUND INFORMATION

A conventional method for detecting errors in a program code, which is executed on a computer system and may be implemented in software or hardware, consists of testing it with the aid of a fuzz testing method for program execution errors or system crashes. In the process, the so-called fuzz inputs for the computer system are generated, a program code to be tested by the inputs is executed, and the function of the algorithm of the program code is monitored. The monitoring of the execution of the program code includes the determination whether the running of the algorithm leads to a program execution error, that is to say, a system crash or an unexpected execution stop, for instance.

While the program is executed, the internal behavior of the program sequence is monitored, in particular with regard to the program sequence paths executed by the program code. This process is repeated using different inputs in order to obtain information about the behavior of the program code for a large bandwidth of inputs. The goal of the program code monitoring consists of generating the inputs in such a way that the greatest possible coverage of the program sequence paths is achieved, or in other words, the greatest possible number of program sequence paths is run through during the repeated variation of the inputs.

If an error or an unexpected behavior occurs while executing a program code, then this is recognized by the fuzzing tool and corresponding information that indicates which fuzz input has led to the error is signaled. Examples of such fuzzing tools are the American fuzzy lop, libFuzz, or honggfuzz.

SUMMARY

According to the present invention, a method for testing a program code by fuzz testing and a corresponding system are provided.

Additional embodiments of the present invention are disclosed herein.

According to a first aspect of the present invention, a computer-implemented method for performing a test for a program code is provided. In accordance with an example embodiment of the present invention, the method includes the following steps:
Providing a modified program code, which includes the program code to be tested and at least one code segment, the at least one code segment monitoring an execution sequence of execution segments, and the code segment being developed to induce a program termination when an impermissible execution sequence is detected;
Performing a fuzz test for the modified program code;
signaling a program termination when an impermissible execution sequence is detected.

Conventional fuzzing tools allow testing of a program code by applying a fuzz input and determining whether a faulty execution was detected. The faulty execution, for instance, may have the effect of an extraordinary ending of the program or the like. As a rule, fuzzing tools are not suitable for detecting other types of errors such as an undesired function call sequence or the like because these do not necessarily lead to a program termination.

Therefore, the above method provides for the implementation of an additional code segment in the program code, which detects an undesired program characteristic and induces a program termination when an undesired program characteristic is detected. The implementation of the additional code segment is able to be inserted manually or automatically. The program termination is then detectable by the fuzzing tool. Since a fuzzing tool is also able to detect the program sequence path in which the program termination occurs, the undesired program characteristic may be allocated to the fuzz input that has led to a program termination triggered by the code segment. This may particularly be determined in that the program sequence path that was run through until the program termination occurred has included a program path of the injected code segment.

In particular, the injected code segment provides for monitoring of a program state during an execution of the fuzzing process and for defining an error criterion that leads to an intentional program termination if temporally successive program states do not correspond to a predefined test criterion.

In this way, in addition to the conventional fuzz test, a fuzzing tool is also able to detect faulty calls of functions or function sequences that would not necessarily have led to a program termination. No manipulation of or intervention in the fuzzing tool is necessary for this purpose.

Furthermore, the modified program code is able to be generated by compiling the program code to be tested and the at least one code segment and subsequent merging of the compiled program code and the compiled code segment or by merging the program code to be tested and the at least one code segment and subsequent compiling.

Alternatively, the code segment is able to be carried out in a separate thread.

In addition, the execution segments may include functions, function calls, program sequence paths or code lines.

According to one embodiment of the present invention, the code segment may have code parts that set a flag in each case when a certain execution segment is carried out, and at the end of the program execution or in a separate process, the flags are queried or monitored in accordance with a predefined execution condition in order to detect an impermissible execution sequence.

It may be provided that the execution sequence is carried out by monitoring one or more variables or a memory area.

According to a further aspect of the present invention, a device, in particular a data processing device, for performing a test for a program code is provided. In accordance with an example embodiment of the present invention, the device is configured
to supply a modified program code, which includes the program code to be tested and at least one code segment, the at least one code segment monitoring an execution sequence of execution segments, and the code segment being developed to induce a program termination when an impermissible execution sequence is detected;

performing a fuzz test for the modified program code;

signaling a program termination when an impermissible execution sequence is detected.

BRIEF DESCRIPTION OF THE DRAWINGS

Example embodiments of the present invention are described in greater detail below based on the figures.

DETAILED DESCRIPTION OF EXAMPLE EMBODIMENTS

Figure 1:
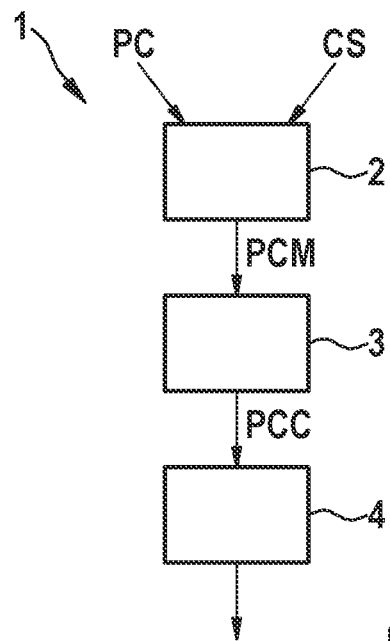
FIG. 1 shows a schematic illustration of a system for performing a fuzz test of a program code, in accordance with an example embodiment of the present invention.
Figure 3:
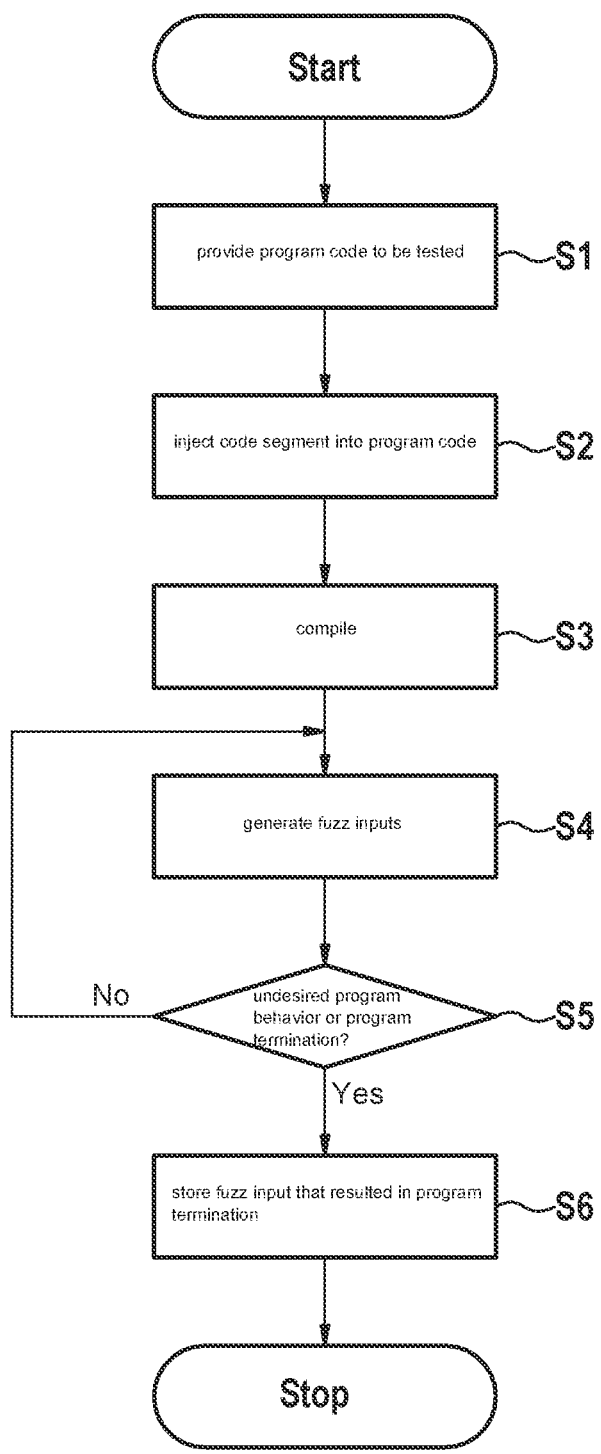
FIG. 3 shows a flow diagram to illustrate the method for fuzz testing of a program code, in accordance with an example embodiment of the present invention.

In the following text, a method for testing a program code with the aid of a fuzzing tool is described. An embodiment of a system 1 for performing such a fuzz testing method is shown in FIG. 1 by way of example. The present method for performing a fuzz test will be described in greater detail based on the flow diagram of FIG. 3.

To begin with, in step S1, a program code PC to be tested is provided. As a rule, program code PC is a software code, but may possibly also be an algorithms implemented in hardware.

With the aid of an injector component 2, a code segment CS, which implements a test criterion, is injected into program code PC in step S2. Code segment CS is developed to query temporally sequential program states of the program code while program code PC is executed in the course of the fuzz testing method. In particular, the code segment may be implemented as its own thread for this purpose in order to allow for permanent monitoring of the program sequence of the program code. As an alternative, the code segment may be serially implemented in program code PC so that the checks take place when the corresponding check code is executed. Code segment CS furthermore has a code that causes an extraordinary termination of the program code execution when the error criterion has been satisfied.

After code segment CS was implemented in the program code, program code PC is compiled in a compiler 3 in step S3 in order to check compiled program code PCC with the aid of a fuzzing tool 4.

The execution of compiled program code PCC using fuzzing tool 4 in step S4 automatically and successively generates fuzz inputs for the next executions of compiled program code PCC so that the corresponding fuzz inputs are supplied to the execution of compiled program code PCC.

In step S5, it is checked whether an undesired program behavior or a program termination has occurred. If a program termination arises during the execution of compiled program code PCC (alternative: yes), then the fuzz input that has resulted in the program termination is stored in step S6 and signaled as the output of the fuzzing system. In the other case (alternative: no), a return to step S4 takes place and the check of compiled program code PCC is repeated using a modified fuzz input.

The output of the fuzzing method may be used in different ways. For example, it may be directly used as the test result for developers or be used for the automatic generation of project plan tasks for a development team in order to further develop the software. In addition, it is able to be made available in the form of a quality indication for subsequent tests. The result of the fuzz test is able to be used to examine the monitored faulty behavior in an automated manner and to correct the program code automatically (automatic patch generation). In addition, the result of the fuzz test makes it possible to automatically set break points within a development environment (tool for programmers) so that the development tool is able to make the debugging easier for a programmer and set it up in an automated manner.

In addition, the result of the fuzz test is able to be used to modify in an automated manner a location in the program code where an error has occurred, in such a way that log information is generated. As soon as the program is used productively, this additional log information may make it easier to locate errors in the field.

On the basis of faulty fuzz inputs, it is possible to generate rules for intrusion detection systems (firewalls) in an automated manner so that corresponding inputs are able to be filtered out from a communications network in products in the field before they reach the actual program code.

In particular, if errors are discovered, the corresponding faulty inputs are able to be analyzed in order to assess the severity of the error and to thereby prioritize the correction based on the severity of the error.

For instance, code segment CS may be developed to check a sequence of function calls. Code segment CS, for example, may check whether a value is stored in a database only if a function that checks whether the input value has a predefined format was called up beforehand. The sequence of the function calls to be checked is able to be manually predefined by a developer or in an automated manner by a test environment.

As a further example, a function that reads out information from a data memory is able to be carried out only if an authentication of the user implementing the call-up was successful beforehand.

In addition, in a more complex example, code segment CS may be predefined so that two or more than two functions, two or more than two program lines or two or more than two program sequence paths may be called up only in alternation such as a blocking and a release function for certain data structures. For instance, the specification for the intended sequence of the function calls is able to be easily predefined as a finite state machine or as a list such as a directed graph.

For example, code segment CS may provide that a test variable be set for each code segment, based on which a regular, correct sequence of the function calls is able to be determined.

As an example of the monitoring of the alternating call-up of a blocking and release condition, blocking is able to be initialized by a blocking flag=0 and a release by a release flag=0. Moreover, a counter value counter=1 may be initialized. At the start of each relevant function (release or blocking function), injector component 2 adds a program logic to program code PC as part of inserted code segment CS, which sets the current value of the release flag (for the release function) and of the blocking flag (for the blocking function) to the value of the global counter value counter and increments the counter value counter.

Code segment CS queries conditions of the previously generated global variable which indicates whether the desired characteristic of the sequence of the function executions has been satisfied. At a certain position in modified, compiled program code PCC, which is always executed at the end of the global program execution, injector component 2 adds program lines of code segment CS, which cause an extraordinary program termination (exit (1)) of the program if the error criterion has not been satisfied.

In the following text, an example of a condition according to the error criterion is illustrated when a call-up of one of the functions is followed by multiple call-ups of the other function. In this case, the execution of the compiled program code would be terminated extraordinarily.

If ((blocking-flag !=0|| release-flag !=O) &&!((blocking-flag—release-flag==1)||(release-flag—blocking-flag==1)), then exit (1).

This check can be inserted into one of the parts of the code segments or be inserted at a global location of the program code. As an alternative, the check may also be carried out in a separate process, which is executed in parallel with the compiled program code.

The query of a state of the program code execution may also include monitoring of one or more variables or of a memory area.

Figure 2:
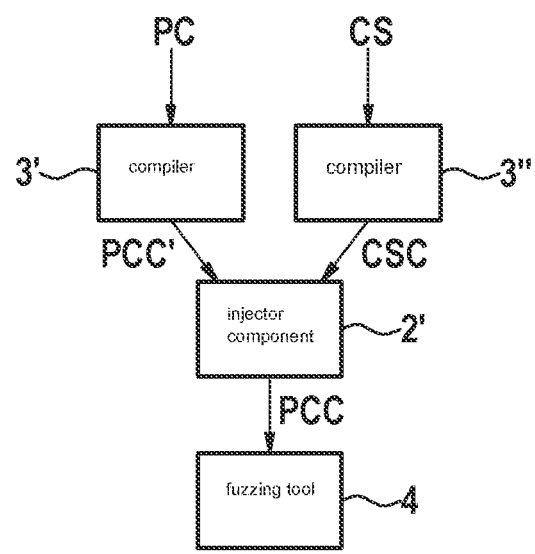
FIG. 2 shows an alternative embodiment of the system for performing fuzz tests, in accordance with the present invention.

As illustrated in FIG. 2, the fuzz system may also compile program code PC and code segment CS separately in compilers 3', 3" and combine them only subsequently in an injector component 2'. Next, it is conveyed to a fuzzing tool 4 as in the embodiment of FIG. 1.

Instead of counter variables, the error criterion is also able to be carried out using a program stack for checking the sequence of recursive function calls.

Moreover, in the same way, code segment CS is able to be injected into program code PC as a machine code that does not require any compiling.

In addition, the sequence of function calls to be checked is also able to be implemented in the program code by assertions. An 'assertion' is a program construct that is part of the programming standard such as C/C++. The function of this program construct is to evaluate the Boolean expression when "assert(x>5)", for example, is reached, and in the event that it is evaluated as 'false', the program is terminated with an error.

Instead of storing counter variables, they may also be stored in a global variable of the collection type such as a list. In the global variable, the execution sequence of the execution segments is stored and checked at a later point in time by reading out the global variables. This is helpful in particular when it is not the last function calls that are relevant but the entire history of program calls.

What is claimed is:

1. A computer-implemented method for performing a test for a program code, the method comprising the following steps:
providing a modified program code, which includes the program code to be tested and at least one code segment, the at least one code segment monitoring an execution sequence of execution segments, and the code segment being configured to induce a program termination when an impermissible execution sequence is detected;
performing a fuzz test for the modified program code;
signaling a program termination when an impermissible execution sequence is detected, wherein the code segment has code parts that set a flag in each case when a certain execution segment is carried out, and at an end of the execution sequence or in a separate process, the flags are queried or monitored in accordance with a predefined execution condition in order to detect the impermissible execution sequence.

2. The method as recited in claim 1, wherein the modified program code is generated by compiling the program code to be tested and the at least one code segment and subsequently merging of the compiled program code and the compiled code segment or by merging the program code to be tested and the at least one code segment and subsequently compiling the merged code.

3. The method as recited in claim 1, wherein the code segment is carried out in a separate thread.

4. The method as recited in claim 1, wherein the execution segments include functions, or program sequence paths, or code lines.

5. The method as recited in claim 1, wherein the execution sequence is carried out by monitoring one or more variables or a memory area.

6. A data processing device, comprising:
a processor configured to perform a computer-implemented test for a program code, the processor configured to perform the computer-implemented test by:
supplying a modified program code, which includes the program code to be tested and at least one code segment, the at least one code segment monitoring an execution sequence of execution segments, and the code segment being configured to induce a program termination when an impermissible execution sequence is detected;
performing a fuzz test for the modified program code;
signaling a program termination when an impermissible execution sequence is detected, wherein the code segment has code parts that set a flag in each case when a certain execution segment is carried out, and at an end of the execution sequence or in a separate process, the flags are queried or monitored in accordance with a predefined execution condition in order to detect the impermissible execution sequence.

7. A non-transitory machine-readable memory medium on which is stored a computer program for performing a test for a program code, the computer program, when executed by a data processing device, causing the data processing device to perform the following steps:
providing a modified program code, which includes the program code to be tested and at least one code segment, the at least one code segment monitoring an execution sequence of execution segments, and the code segment being configured to induce a program termination when an impermissible execution sequence is detected;
performing a fuzz test for the modified program code;
signaling a program termination when an impermissible execution sequence is detected, wherein the code segment has code parts that set a flag in each case when a certain execution segment is carried out, and at an end of the execution sequence or in a separate process, the flags are queried or monitored in accordance with a predefined execution condition in order to detect the impermissible execution sequence.

* * * * *